US009018579B2

(12) United States Patent
Kasevich et al.

(10) Patent No.: US 9,018,579 B2
(45) Date of Patent: Apr. 28, 2015

(54) ATOM INTERFEROMETRY HAVING SPATIALLY RESOLVED PHASE (71) Applicant: The Board of Trustees of the Leland Stanford Junior University, Palo Alto, CA (US)

(72) Inventors: Mark A. Kasevich, Palo Alto, CA (US); Jason M. Hogan, Palo Alto, CA (US); Susannah M. Dickerson, Palo Alto, CA (US); Alex Sugarbaker, Atherton, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/272,195

(22) Filed: May 7, 2014

(65) Prior Publication Data
US 2014/0375998 A1    Dec. 25, 2014

Related U.S. Application Data (60) Provisional application No. 61/820,637, filed on May 7, 2013.

(51) Int. Cl.
G21K 5/04 (2006.01)
G01B 9/02 (2006.01)
(52) U.S. Cl.
CPC ........ *G01B 9/02001* (2013.01); *G01B 9/02041* (2013.01); *G01B 9/02076* (2013.01)

(58) Field of Classification Search
USPC ............ 250/251; 701/200, 208, 220; 702/152
See application file for complete search history.

(56) References Cited

U.S. PATENT DOCUMENTS

| 7,915,577 | B2 | 3/2011 | Fatemi et al. | |
| 2005/0004750 | A1* | 1/2005 | Huddle | 701/200 |
| 2005/0027489 | A1* | 2/2005 | Kasevich et al. | 702/189 |
| 2011/0125460 | A1* | 5/2011 | Suzuki | 702/179 |

OTHER PUBLICATIONS

Muntinga et al., "Interferometry with Bose-Einstein Condensates in Microgravity", Mar. 2013, 093602-1 to 093602-5, Physical Review Letters v110.
Peters et al., "High-precision gravity measurements using atom interferometry", 2001, 25-61, Metrologia v38.
Gustavson et al., "Precision rotation measurements with an atom interferometer gyroscope", 1997, 2046-2049, Physical Review Letters v78n11.

\* cited by examiner

*Primary Examiner* — Nicole Ippolito
(74) *Attorney, Agent, or Firm* — Lumen Patent Firm (57) ABSTRACT

In an atom interferometer, improved results are obtained by configuring the interferometer to have a baseline fringe pattern, in combination with spatially resolved measurements at the interferometer ports. Two aspects of this idea are provided. In the first aspect, the atoms are configured to expand from an initial point-like spatial distribution. The result is an informative correlation between atom position and interferometer phase. In the second aspect, a phase shear is applied to the atom ensemble of an atom interferometer. In both cases, spatially resolved measurements at the interferometer ports can provide enhanced interferometer performance, such as single-shot operation.

16 Claims, 11 Drawing Sheets

Rotation Rate Offset, $\delta\Omega_x$ ($\mu$rad/s)

Rotation Rate Offset, $\delta\Omega_x$ ($\mu$rad/s)

Rotation Rate Offset, $\delta\Omega_x$ ($\mu$rad/s)

ATOM INTERFEROMETRY HAVING SPATIALLY RESOLVED PHASE

CROSS REFERENCE TO RELATED APPLICATIONS

This application claims the benefit of U.S. provisional patent application 61/820,637, filed on May 7, 2013, and hereby incorporated by reference in its entirety.

GOVERNMENT SPONSORSHIP

This invention was made with Government support under contract number N00244-09-1-0063 awarded by the Naval Postgraduate School. The Government has certain rights in this invention.

FIELD OF THE INVENTION

This invention relates to atom interferometers.

BACKGROUND

Atom interferometry is based on the quantum mechanical interference of atom wave functions. For example, an atom interferometer can have two output ports (A and B) where the probability of an atom appearing at ports A or B depends on the relative phase of two interfering atom wave functions. Typically, the signals from the interferometer ports are simply spatially averaged to provide the interferometer output.

Unfortunately, this has the disadvantage that data from several interferometer runs usually has to be considered in order to extract useful data from the raw interferometer data. In other words, such interferometers do not provide a single-shot mode where useful data can be obtained from a single interferometer run.

SUMMARY

We have found that making spatially resolved measurements, in combination with providing a baseline fringe pattern at the interferometer ports, can provide significantly enhanced capability. Two aspects of this idea have been investigated.

A) Point Source Interferometry (PSI) (Section B Below)

In the first aspect, the atoms are configured to expand from an initial point-like spatial distribution. With such a distribution, each atom's final position is approximately proportional to its initial velocity. Since the interferometer phase shift is also dependent on initial velocity, the result is an informative correlation between atom position and interferometer phase. Spatially resolved measurements at the interferometer output ports can be used to directly characterize these velocity dependent phase shifts.

B) Phase Shear Readout (PSR) (Section C Below)

In the second aspect, a phase shear is applied to the atom ensemble of an atom interferometer. Spatially resolved measurements at the interferometer output ports can be used to directly characterize changes to the imposed shear due to quantities being measured. Measuring changes to an imposed phase shear can be much more accurate than attempting to make the same measurements with no imposed phase shear. Relative timing of interferometer control pulses and/or application of laser beam tilts during operation of the interferometer are examples that can provide the imposed phase shear.

These aspects can be practiced individually or in any combination. One application of these ideas is to atom interferometric inertial force sensors. For example, multi-axis imaging detection in conjunction with spatially localized atomic sources (and/or an applied phase shear) can be used to directly read-out velocity dependent phase shifts due to rotations, gravity gradients, and optical wavefront distortions. Other applications include, but are not limited to: precision gyro-compassing/attitude determination; compact, high accuracy inertial navigation; and precision optical wavefront metrology.

This approach advantageously allows multi-axis rotation measurement in a simple physical configuration, suitable for portable, fieldable instruments. Such instruments are expected to perform at or exceeding the existing state-of-the art. High accuracy navigation, gravimetric, and wavefront sensors play a central role in many industries, including defense, security, and oil/mineral discovery and management. Sensors based on existing technologies are often too expensive for envisioned applications, or do not support performance requirements. This work can provide sensors with the capacity for unprecedented performance levels and price points.

Practice of the invention does not depend critically on details of the atom optics pulse sequences. For example, pulse sequences designed to emphasize/isolate gravity gradient from rotation responses can be employed. Another alternative is the use of light-field imaging to augment interference fringe read-out.

DETAILED DESCRIPTION

In the following description, section A describes general principles relating to various embodiments of the invention, section B describes an experimental demonstration of point source interferometry (PSI), and section C describes an experimental demonstration of phase shear readout (PSR).

A) General Principles

Figure 1:
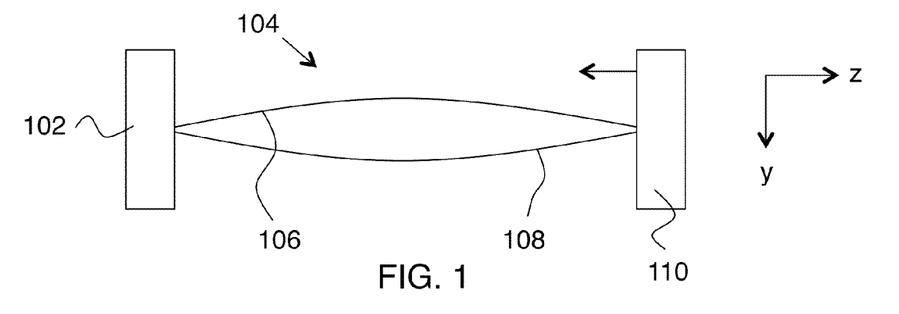
FIG. 1 shows an exemplary embodiment of the invention.

FIG. 1 shows an exemplary embodiment of the invention. In this example, an atom source 102 provides atoms. These atoms propagate through an interferometer region 104 such that the atoms have interfering quantum amplitudes having a relative phase. This interference is schematically shown on FIG. 1 by two paths 106 and 108 that lead the atoms to the same location on the right side of the figure. At least one imaging detector 110 is present. Each imaging detector can effectively define a corresponding interferometer port. The probability of detection of an atom at the interferometer ports is dependent on the relative phase. Here the imaging detectors are configured to provide a spatially resolved image of the relative phase. Alternatively, a single imaging detector can define two or more interferometer ports by use of independent regions of the same imaging hardware.

The interferometer is configured to provide a predetermined baseline fringe pattern at the interferometer ports, and the output signal from the interferometer is obtained by analysis of a measured interference fringe pattern compared to the baseline fringe pattern. Here the baseline fringe pattern can be any fringe pattern that has substantially non-uniform relative phase (i.e., a relative phase variation of 180° or more in the pattern). Although this approach is somewhat more complicated than a conventional interferometer configuration with no baseline fringe pattern (i.e., where the baseline relative phase is uniform or nearly so), it can also provide significant advantages in practice, such as enabling single-shot operation.

Figure 2A:
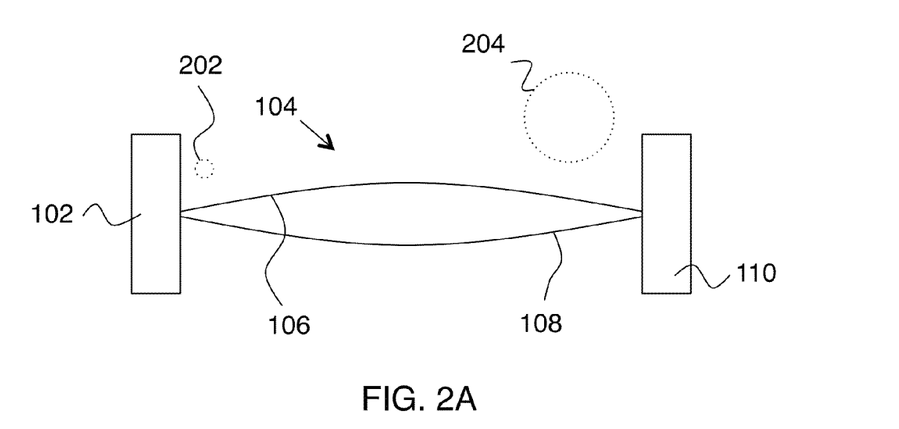
FIGS. 2A-B show exemplary methods of providing a predetermined baseline interferometer fringe pattern.

There are various ways of providing the baseline fringe pattern. FIG. 2A shows an example of point source interferometry (PSI), where the atom ensemble expands from an initial ensemble size 202 to a substantially larger final ensemble size 204 at detection. Preferably the ratio of the initial ensemble size to the final ensemble size is less than about 0.1. In this approach, the final positions of the atoms are correlated with their initial velocities, and the initial velocities are also correlated with the relative phase. The result is a position-dependent relative phase that defines the baseline fringe pattern. Section B below describes this approach in greater detail.

Figure 2B:
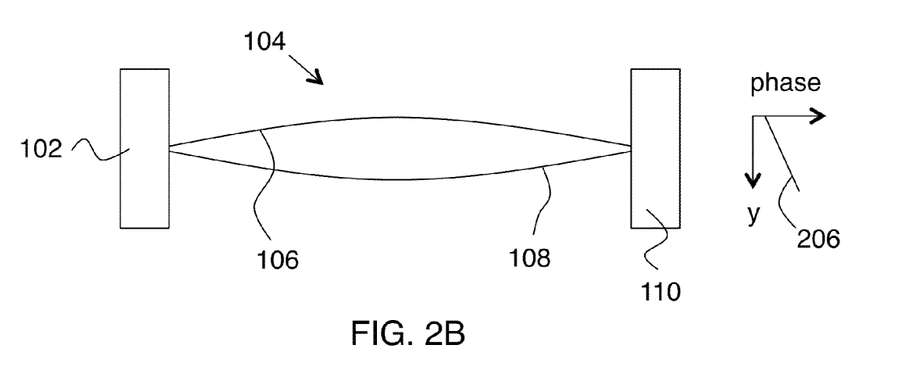

FIG. 2B shows an example of phase shear readout (PSR) where an applied input shear of the relative phase in the atom interferometer is present. The result is a baseline relative phase 206 that varies with position as schematically shown on FIG. 2B. The input shear can be provided by application of a beam tilt between optical pulses in an atom interferometry excitation sequence. Alternatively, the input shear can be provided by application of a timing asymmetry between optical pulses in an atom interferometry excitation sequence. Beam tilt and timing asymmetry can be combined to provide the input shear. Furthermore PSI and PSR can be practiced independently or in any combination.

Preferably, the atom interferometer is configured for single shot operation. This capability is a significant advantage compared to a conventional interferometer where gathering data from multiple shots is often needed to extract the results. The main reason this approach enables single shot operation is that the baseline fringe pattern provides valuable information on interferometer operation (such as actual contrast ratio data) in a single shot that cannot be obtained in single shot data from a conventional interferometer.

This approach is helpful for any application of atom interferometry, including but not limited to: inertial force sensors, gyroscopes, attitude sensors, inertial navigation sensors and systems, gravity sensors, gravity gradient sensors, and optical wave front metrology sensors and systems.

Figure 3A:
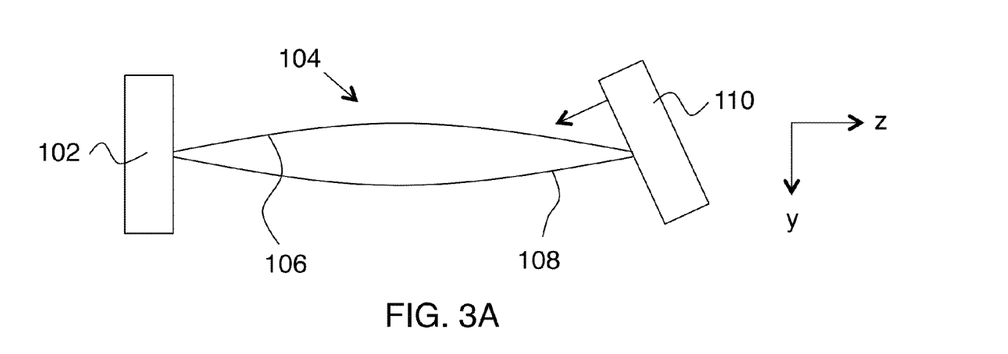
FIG. 3A-B show exemplary geometrical configurations for an atom interferometer.
Figure 3B:
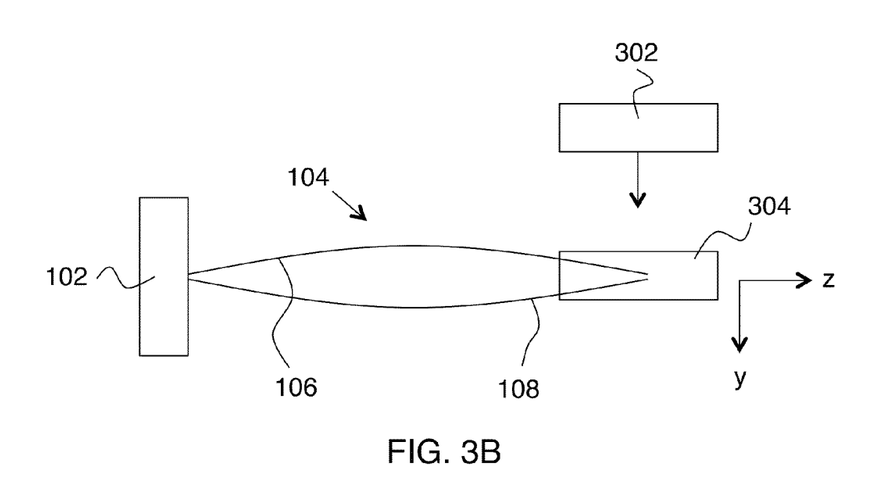

Various geometrical configurations are possible. The example of FIG. 1 shows imaging detector 110 having its line of sight (shown with an arrow) parallel to the interferometer axis (z axis on FIG. 1). Here the interferometer axis is defined to be the axis along which the optical pulses propagate and along which the interferometer is sensitive. The example of FIG. 3A shows imaging detector 110 having a line of sight that intersects the interferometer axis at an angle other than 0 degrees or 90 degrees (i.e., at an acute or oblique angle). The example of FIG. 3B shows two imaging detectors 302 and 304 that have lines of sight perpendicular to each other and are also perpendicular to the interferometer axis. Here the z axis is the interferometer axis, detector 302 has its line of sight along the y axis, and detector 304 has its line of sight along the x axis (i.e., out of the plane of the figure). The ability to look parallel to the interferometer beam axis is particularly interesting because a single camera (instead of two) can be used to simultaneously measure both components of a rotation vector.

B) Point Source Atom Interferometry

Light-pulse atom interferometry enables precision tests of gravity and electrodynamics as well as practical applications in inertial navigation, geodesy, and timekeeping. Phase shifts for light-pulse atom interferometers demonstrate sensitivity to the initial velocity distribution of the atom source, often resulting in inhomogeneous dephasing that washes out fringe contrast. In this section, we show that use of spatially resolved imaging in combination with an initially spatially localized atomic source allows direct characterization of these phase shifts. We refer to this technique as point source interferometry (PSI).

The contrast loss associated with such inhomogeneous dephasing is not fundamental, but is a consequence of atom detection protocols that average over velocity-dependent phase shifts. With PSI we establish a correlation between velocity and position and use spatially-resolved detection to form an image of the ensemble that reveals its velocity-dependent phase structure. A simple way to realize this correlation is through ballistic expansion of the ensemble. In the limit that the ensemble size at detection is much larger than its initial size, each atom's position is approximately proportional to its initial velocity. Consequently, any initial velocity-dependent phase shift results in a spatial variation of the interferometer phase, yielding a position-dependent population difference between the two output ports of the interferometer.

An important example of velocity sensitivity is due to rotation of the interferometer laser beams. Rotation at a rate $\Omega$ leads to a phase shift (Table 1, term 2) that depends on $(v_x, v_y)$, the initial transverse velocity of the atom. In a rotating frame, this effect may be interpreted as a Coriolis acceleration. PSI also allows observation of longitudinal velocity-dependent phase shifts in asymmetric atom interferometers (e.g., Table 1, term 3; in the work of section B, $\delta T = 0$ μs).

TABLE 1

Velocity-dependent phase shifts and their sizes assuming the following: $k_{eff} = 2k = 2 \times 2\pi/780$ nm, $T = 1.15$ s, initial velocity spread $v_i = 2$ mm/s (50 nK), initial positions $x_i = 200$ μm, $|\Omega| = 60$ μrad/s, gravity gradient tensor components $T_{zi} = 3075$ E (here E is an abbreviation of the Eotvos unit, which is $10^{-9}$ $1/s^2$ in SI units), interferometer pulse timing asymmetry $\delta T = 100$ μs, and wavefront curvature $\alpha = (\lambda/10)/cm^2$. Note that for $T_{zx}$, $T_{zy} = 50$ E the size of term 5 is significantly smaller. The acceleration (term 1) and gravity curvature (term 4) phase shifts are shown for reference.

| Term | Phase Shift | Size (rad) |
|---|---|---|
| 1 | $k_{eff}gT^2$ | $2.1 \times 10^8$ |
| 2 | $2k_{eff} \cdot (\Omega \times V)T^2$ | 5.1 |
| 3 | $k_{eff}v_z\delta T$ | 3.5 |
| 4 | $(\hbar k_{eff}^2/2 \, m)T_{zz}T^3$ | 0.44 |
| 5 | $k_{eff}T z_i(x_i + v_i T)T^2$ | 0.18 |
| 6 | $(½)k_{eff}\alpha(v_x^2 + v_y^2)T^2$ | 0.04 |

Figure 4A:
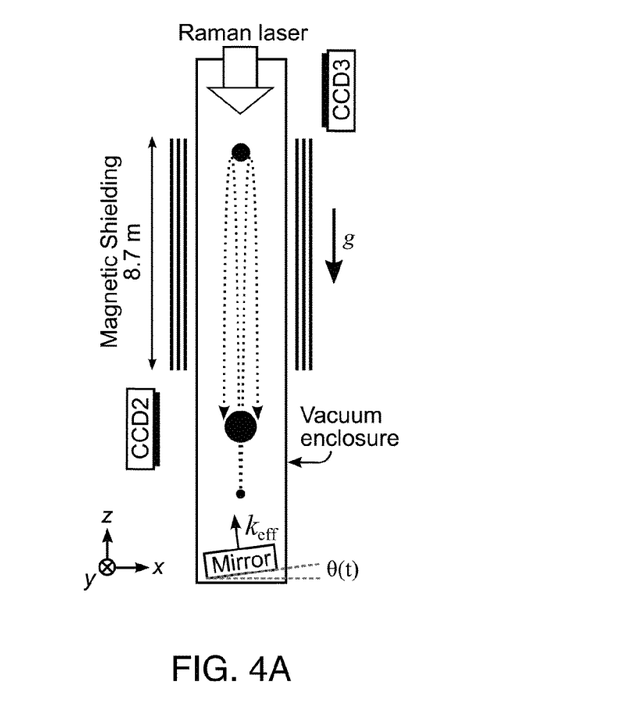
FIGS. 4A-C show a first experimental setup relating to point source interferometry (PSI).

FIG. 4A is a schematic diagram of the experimental apparatus, viewed from the side. The atom cloud (black circle) is cooled and launched from below the magnetically-shielded interferometry region. The two interferometer output ports are imaged by both perpendicular cameras (CCD1 and CCD2). All interferometry pulses are delivered from the top of the tower and are retroreflected off a mirror (at angle $\theta(t)$ resting on a piezo-actuated tip-tilt stage.

Figure 4B:
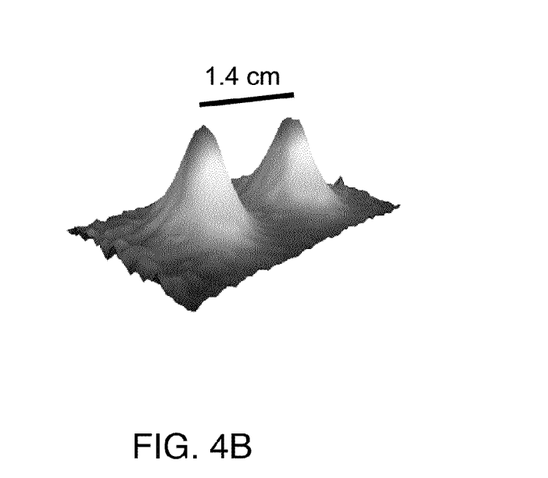

FIG. 4B is an image of the ensemble after a beamsplitter pulse showing the separation between two halves of the atomic wavepacket. For this shot we launched the atoms with extra velocity to reach CCD3.

Figure 4C:
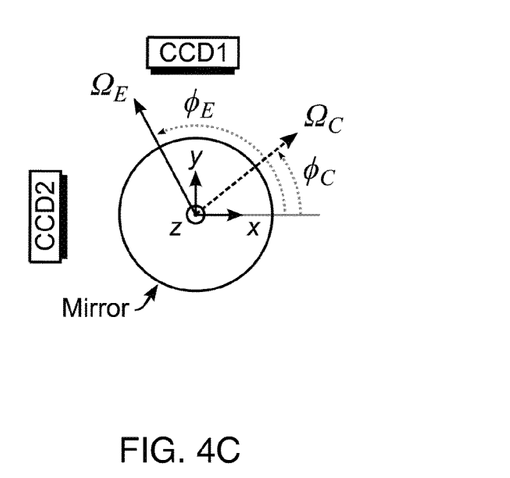

FIG. 4C is a top view of the tip-tilt stage and lower cameras with the direction and magnitude of the Earth rotation $\Omega_E$, and an (arbitrary) applied counter-rotation $\Omega_C$. In our apparatus, $\phi_E \approx 105°$.

To demonstrate PSI, we induce a velocity-dependent phase shift in a $^{87}$Rb Raman light-pulse atom interferometer. We launch cold atoms from the bottom of a 10-meter tall vacuum enclosure (FIG. 4A) and apply a three-pulse accelerometer sequence ($\pi/2$-$\pi$-$\pi/2$). The first pulse serves as an atom beamsplitter, coherently driving the atoms into a superposition of states $|F=1;p\rangle$ and $|F=2;p+\hbar k_{eff}\rangle$, where p is the initial momentum, F is the hyperfine level, and $\hbar k_{eff} = 2\hbar k$ is the momentum difference between the two states. Over the subsequent $T=1.15$ s interrogation interval, the two parts of the atom's wave function separate vertically by $(\hbar k_{eff}/m)T=1.4$ cm (FIG. 4B), at which time a mirror pulse reverses the relative momenta and internal states. After an identical drift time, a final beamsplitter pulse interferes the atom wave packets. We then image the atom fluorescence using a pair of CCD cameras located below the interferometry region (FIG. 4C). By the time of imaging, 2.6 s after launch, the 50 nK atomic source has expanded to 30 times its original size, establishing the position-velocity correlation necessary for PSI.

Figure 5A:
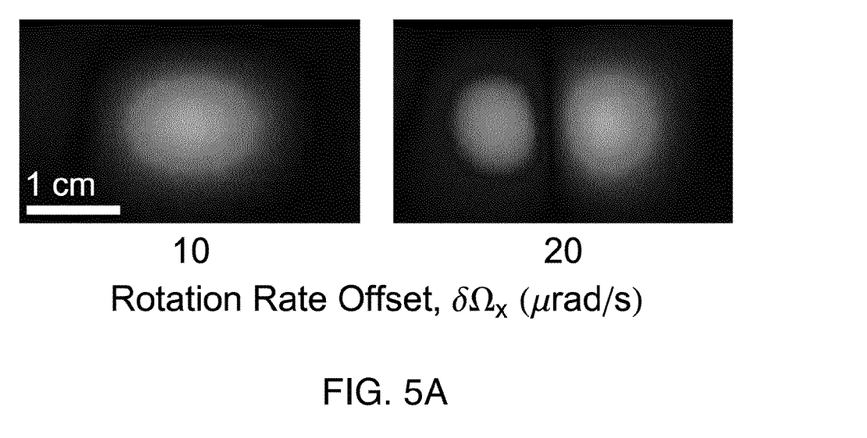
FIGS. 5A-C show measured fringes from the setup of FIGS. 4A-C.
Figure 5B:
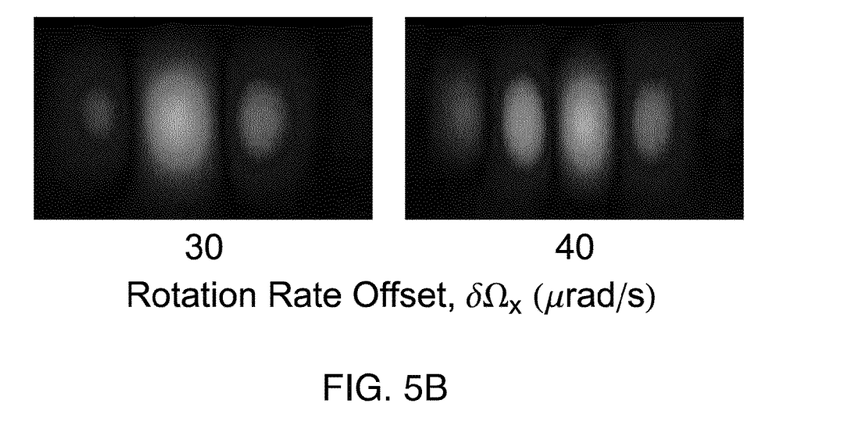
Figure 5C:
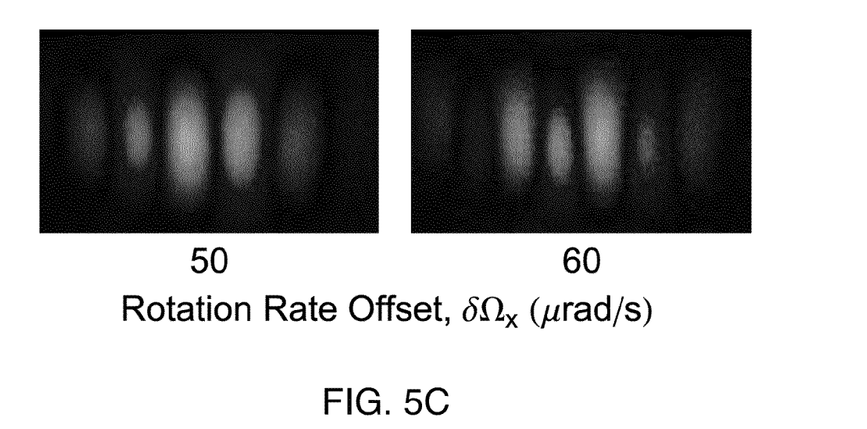

We imprint a velocity-dependent phase shift by rotating the atom interferometer laser beam axis at a tunable rate $\delta\Omega$. FIGS. 5A-C show typical detected atom distributions for several different values of $\delta\Omega_x$. More specifically, FIGS. 5A-C show spatial fringes on the atom population observed on CCD2 versus rotation rate offset $\delta\Omega_x$. The second output port, with fringes π radians out of phase, is not shown. Each image is the second-highest variance principle component arising from a set of 20 measurements.

Figure 6:
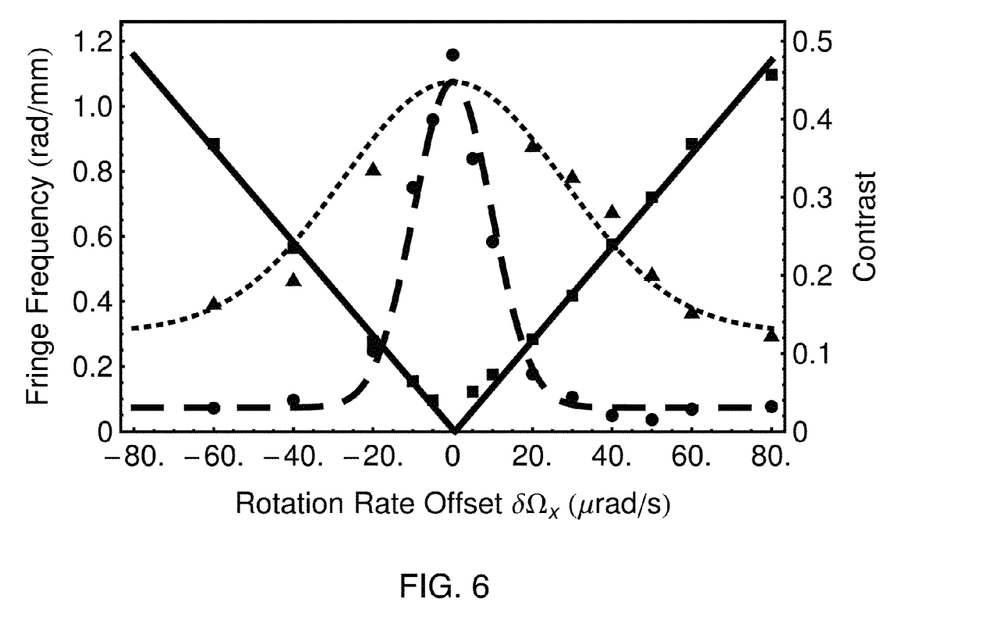
FIG. 6 shows experimental results from the first experimental setup.

The velocity-dependent phase gradient we observe in FIGS. 5A-C is proportional to the applied rotation rate (FIG. 6). For faster rates, the phase shift is large enough that multiple fringe periods appear across the ensemble. Without spatially resolved detection, averaging over these fringes would yield negligible contrast. With PSI, we realize record duration light-pulse atom interferometry, even in the presence of large rotation rates.

FIG. 6 shows fringe spatial frequency (squares, solid line) and contrast versus applied rotation for the data in FIGS. 5A-C. The fitted slope of the fringe spatial frequency is consistent with term 2 of Table 1 to <10%. Fringe contrast is observed over a wide range of rotation rates (triangles, dotted line), while the contrast from integration detection decays rapidly (circles, dashed line). Both Gaussian fits are constrained to be centered at the observed point of zero phase gradient ($\delta\Omega_x \approx 0$ μrad/s), and the fringe contrast fit is further constrained to have the same peak value as the integrated contrast fit, since the methods should agree in the large wavelength limit.

To create the cold atomic source, we load $4 \times 10^9$ atoms from a magneto-optical trap into a plugged quadrupole trap, where we evaporate with a microwave knife. A magnetic lensing sequence in a time-orbiting potential (TOP) trap collimates the atom source in 3D, cooling and expanding the cloud while maintaining high phase space density. The procedure is similar in principle to δ-kick cooling, but uses the atoms' continuous expansion over ~100 ms against a shallow (~5 Hz) harmonic trap rather than a short (few ms) impulse. The magnetic fields are rapidly turned off when the atoms have reached their minimum velocity (maximum expansion) in all three dimensions. The final cloud contains $4 \times 10^6$ atoms at 50 nK with an initial radius of 200 μm Alternatively, we can produce clouds at 3 nK with $10^5$ atoms and an initial radius of 30 μm by evaporating in a time-orbiting potential trap with a microwave knife prior to the magnetic lensing sequence.

A microwave pulse transfers the ultracold atoms into a magnetically-insensitive Zeeman sublevel. They are then coherently launched with an optical lattice, which transfers 2386 photon momenta with a peak acceleration of 75 g. They enter the interferometer region, a 10 cm diameter, 8.7 m long aluminum vacuum tube. A solenoid wound around the tube provides a bias magnetic field, and three layers of magnetic shielding suppress the environmental field to <1 mG.

A small fraction of the atoms are launched into $\pm 2\hbar k$ momentum states. We purify the ensemble's vertical momentum with a 135 μs Raman π-pulse, which transfers a 25 nK ($0.3\hbar k$) subset of the ensemble into $|F=1\rangle$. A short pulse resonant with $|F=2\rangle \rightarrow |F'=3\rangle$ blows away atoms that did not transfer.

A pair of fiber-coupled 1 W tapered amplifiers (TAs) generate the retroreflected interferometer pulses. The seeds for the two TAs are derived from a common source cavity-stabilized to a linewidth of <1 kHz and detuned 1.0 GHz blue from the 780 nm $D_2$ line ($|F=2\rangle \rightarrow |F'=3\rangle$). The seed for one TA passes through a fiber phase modulator that generates the 6.8 GHz sideband necessary for Raman interferometry. An acousto-optic modulator (AOM) chirps the other seed to correct for the atoms' Doppler shift. The output of the TAs are combined on a polarizing beamsplitter cube, and the copropagating beams are diffracted by an acousto-optic modulator that acts as a fast optical switch. The beamsplitter and mirror pulses are 35 μs and 70 μs in duration, respectively. The beams have a 2 cm $1/e^2$ intensity radial waist. The relative power of the two beams is chosen empirically to suppress intensity-dependent detunings by balancing AC Stark shifts (to <2 kHz).

Prior to detection, we spatially separate the output ports by applying a short pulse (~50 photon recoils) resonant with $|F=2\rangle \rightarrow |F'3\rangle$. We wait 50 ms before simultaneously halting and imaging the atoms with a 2 MHz red-detuned beam. The atoms are nearly at rest after the first 300 μs of the 5 ms imaging time. The scattered light is collected by two orthogonal CCD cameras, each with a numerical aperture of 0.25 (FIG. 4C). The time from initial atom loading to the final image is 20 s.

We precisely control the direction of the interferometer beams with an in-vacuum, piezo-actuated tip-tilt stage onto which the retroreflection mirror is kinematically constrained. The stage has 1 nrad measured precision and a range of 400 μrad. The stage platform is secured kinematically to three nanopositioners (Nano-OP30; Mad City Labs) by stiff springs. The nanopositioners are bolted to the vacuum enclosure, which is anchored to the vibrationally-quiet ($10^{-8}$ g/$\sqrt{Hz}$) concrete floor.

The rotation of the Earth is a significant source of velocity-dependent phase shifts. At our latitude in Stanford, Calif., the effective rate is $\Omega_E$=57.9 μrad/s, which induces fringes of periodicity similar to the highest rotation rate in FIGS. 5A-C. With the tip-tilt stage we apply a compensating rotation of equal and opposite magnitude ($\Omega_C$=$-\Omega_E$) to eliminate these phase shifts. We implement this rotation by incrementing the mirror's angle in discrete steps between each interferometer pulse. In FIGS. 5A-C and in FIG. 6 we add a variable rotation rate $\delta\Omega_x$ to this nominal rotation compensation vector.

With PSI, we maintain spatial fringe contrast even in the presence of large net rotation rates (FIG. 6). By comparison, the conventional integrated contrast for the same data decays rapidly with increasing rotation rate because a spatial average over the fringe pattern washes out the interference. The reduction in the PSI fringe contrast at higher rotation rates is not fundamental, but results from heating during imaging and imperfect alignment between the applied rotation δω and the camera line-of-sight. Imaging integrates along the line-of-sight (LOS) of the camera (perpendicular to the CCD chip). For maximum fringe contrast, the spatial fringe wavevector is preferably perpendicular to the camera LOS, aligning the planes of the population variation with the LOS.

To compute spatial fringe contrast in FIG. 6, we divide the fitted amplitude of the population fringes by the fitted amplitude of the underlying cloud. While fringes are visible on each raw image, we use Principal Component Analysis (PCA) as a filter to isolate the population fringe from the cloud shape in a model-independent way for more robust fits. The fitted fringe frequency provides the magnitude of the phase gradient. With an optimized imaging protocol, the minimum detectable PSI fringe period is limited by the initial cloud size (300 μm in this work). The imaging process of this experiment limits the minimum detectable fringe period to ~1 mm (e.g., due to heating effects).

We also measure the rotation rate of the Earth. After coarsely compensating for the Earth's rotation with the tip-tilt stage, we tune the applied rate by adding a small rotation $\delta\omega_E \equiv \Omega_C - \omega_E$ along the nominal direction of true North ($\phi_C \approx \Omega_E + \pi$). We observe the resulting phase gradient simultaneously on CCD1 and CCD2. The magnitude of the observed phase gradient depends on the projection of the net rotation rate onto each camera (see FIG. 4C). To detect small phase gradients that generate less than 2π radians of phase across the ensemble, we extract the differential phase $\Delta\Phi_{LR}$ by splitting each image about a vertical line and analyzing the left and right halves as independent interferometers.

Figure 7A:
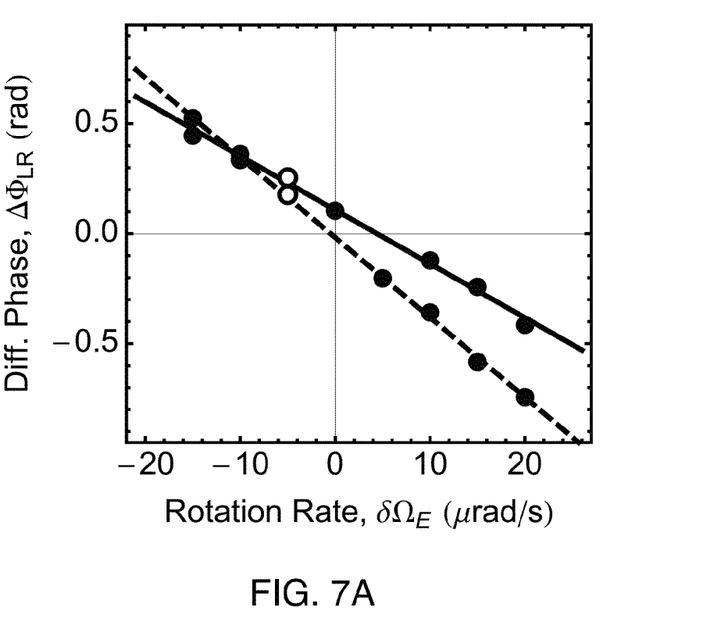
FIGS. 7A-B show operation of the setup of FIGS. 4A-C as a gyroscope.
Figure 7B:
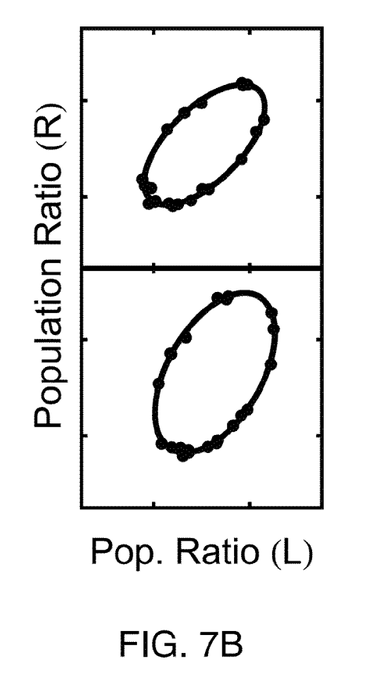

FIG. 7A shows operation as a PSI dual-axis gyroscope. We extract the differential phase $\Delta\Phi_{LR}$ between the left and right sides of the ensemble as a function of the rotation rate $\delta\Omega_E$, as measured on cameras CCD1 (dashed) and CCD2 (solid). FIG. 7B shows sample ellipses emerging from the right-versus-left population ratios of CCD2 (upper) and CCD1 (lower), corresponding to the open circles of FIG. 7A.

FIG. 7A shows $\Delta\Phi_{LR}$ as a function of $\delta\Omega_E$ as observed on CCD1 and CCD2. Each measurement is the result of 20 interferometer cycles. We parametrically plot the population ratio of the left half versus the right (e.g., FIG. 7B) and extract the differential phase and contrast using an ellipse fitting procedure. Occasional trials (<5%) that display no interference appear at the center of the ellipses and are rejected. These trials are clearly distinct from those on the ellipses, and result from experimental glitches (e.g., a loss of laser lock). The horizontal intercept of a linear fit to this data provides a measurement of Earth's rotation rate with a precision of 200 nrad/s.

The difference in the intercepts observed by the two cameras indicates that the rotation compensation direction $\phi_C$ is slightly misaligned from true North $\phi_E$ such that $\Delta\phi \equiv \phi_C - (\phi_E + \pi) \neq 0$. This results in a spurious rotation ($\Delta\phi\Omega_E \sin \phi_E)\hat{x}$ that imprints a phase gradient visible on CCD2 (see Table 1, term 2) independent of $\delta\Omega_E$. Likewise, a spurious rotation ($-\Delta\phi\Omega_E \cos \phi_E)\hat{y}$ imprints a phase gradient visible on CCD1. The slopes for the two cameras in FIG. 7A are different because of unequal projection of $\Omega_E$ and small differences in the projected widths of the ensemble.

Although the mean interferometer phase is dominated by seismic noise contributions at long T, we can infer an acceleration sensitivity using the observed differential phase noise between different parts of the imaged cloud. Rather than compare the left half versus the right half as we did in the gyroscope analysis, we instead divide the output ports in two using a checkerboard pattern and study the differential phase between the combined even and combined odd grid squares. Varying the grid size s in this analysis reveals correlated phase noise at different spatial scales. To ensure that results are independent of the initial grid registration, we compute two grid alignment quadratures (analogous to sine and cosine) for each dimension by offsetting the grid by s/2 in each direction. We then average over alignment using the root mean square of these four results. Analyzing 280 trials with $\omega_C \approx -\omega_E$ we find the differential even-odd phase noise is 2.0 mrad per shot for grid sizes from s=3 mm down to 0.7 mm, the smallest size analyzed. Combined with the acceleration response (Table 1, term 1), this implies an acceleration sensitivity of $6.7 \times 10^{-12}$ g in one shot. The sensitivity is $\delta a/g = \delta\phi/k_{eff}gT^2$ where $\delta\phi = (2.0$ mrad$)/\sqrt{2}$ is the absolute phase noise combining all the atoms from both the even and odd grid squares. Since a single trial takes 20 s, this per-shot sensitivity corresponds to $3.0 \times 10^{-11}$ g/$\sqrt{Hz}$. The acceleration sensitivity of this work is an improvement of more than two orders of magnitude over previous limits. By comparison, the atom shot-noise limit for the $4 \times 10^6$ atoms used in this interferometer at 50% contrast is $\sim 4 \times 10^{-12}$ g in one shot. Note that this grid analysis rejects low spatial frequency variations of the phase across the cloud that originate, for example, from fluctuations in initial kinematics. The results are applicable to measurements where these effects are expected to be common, such as for overlapped ensembles of two species of atoms in an equivalence principle test.

PSI does not require a 10-meter apparatus. A dual-axis gyroscope with shot-noise-limited rotation noise of 100 μdeg/$\sqrt{hour}$ can be realized with $10^6$ atoms prepared at 3 mK in an interferometer with T=10 ms and $4\hbar k$ atom optics cycling at 25 Hz (with atom recapture).

PSI can measure the interferometer beam optical wavefront in situ. This is desirable in precision atom interferometry applications, including gravitational wave detection. Each atom in an expanding ensemble samples the laser phase at three locations, thereby measuring wavefront aberrations. Term 6 of Table 1 models the interferometer response to a parabolic wavefront curvature of the form $k\alpha(x^2+y^2)/2$. Our measured phase noise implies a wavefront sensitivity of $\alpha \sim (\lambda/500)/cm^2$ in one shot.

Finally, PSI allows measurement of multiple components of the gravitational gradient tensor (Table 1, term 5). The sensitivity we report is also sufficient to observe the gravity curvature induced phase shift (Table 1, term 4). Such sensitivity enables precision tests of the equivalence principle and general relativity.

C) Atom Interferometer with Phase Shear

Light-pulse atom interferometers use optical pulses to split, redirect, and interfere freely-falling atoms. They have proven widely useful for precision metrology. Atom interferometers have measured the gravitational and fine-structure constants, are used in on-going laboratory tests of the equivalence principal and general relativity, and have been proposed for use in gravitational wave detection. They have also enabled the realization of high performance gyroscopes, accelerometers, gravimeters, and gravity gradiometers.

Current-generation light-pulse atom interferometers determine phase shifts by recording atomic transition probabilities. These are inferred from the populations of the two atomic states that comprise the interferometer output ports. Due to experimental imperfections, interference contrast is not perfect—the dark port never exhibits complete extinction. It is therefore necessary to independently characterize contrast prior to inferring phase. Typically, this is done with a sequence of multiple shots with different phases, such that the population ratio is scanned through the contrast envelope. Such a protocol relies on the stability of the contrast envelope. In many cases, the contrast varies from shot to shot, introducing additional noise and bias in the phase extraction process.

We present a broadly applicable technique capable of resolving interference phase on a single experimental shot. This is accomplished by introducing a phase shear across the spatial extent of the atom ensemble. The shear is manifest in a spatial variation of the atomic transition probability, which, under appropriate conditions, can be directly observed in an image of the cloud (FIG. 8B). Using this phase shear readout (PSR), it is no longer necessary to vary the phase over many shots to determine the contrast envelope. Instead, the contrast of each shot can be inferred from the depth of modulation of the spatial fringe pattern on the atom ensemble. The interferometer phase is directly determined from the phase of the spatial fringe.

PSR fringes reveal rich details about atom interferometer phase shifts and systematic effects, much as spatially varying optical interference patterns yield information about optical systems and their aberrations. The intentional application of a phase shear is analogous to the use of a wedged optical shear plate, where a large applied shear highlights small phase variations across a laser beam.

Figure 8A:
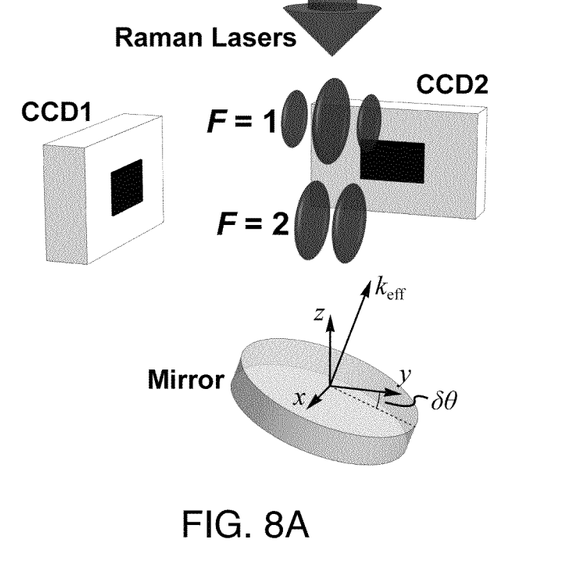
FIGS. 8A-B show a second experimental setup relating to phase shear readout (PSR).
Figure 8B:
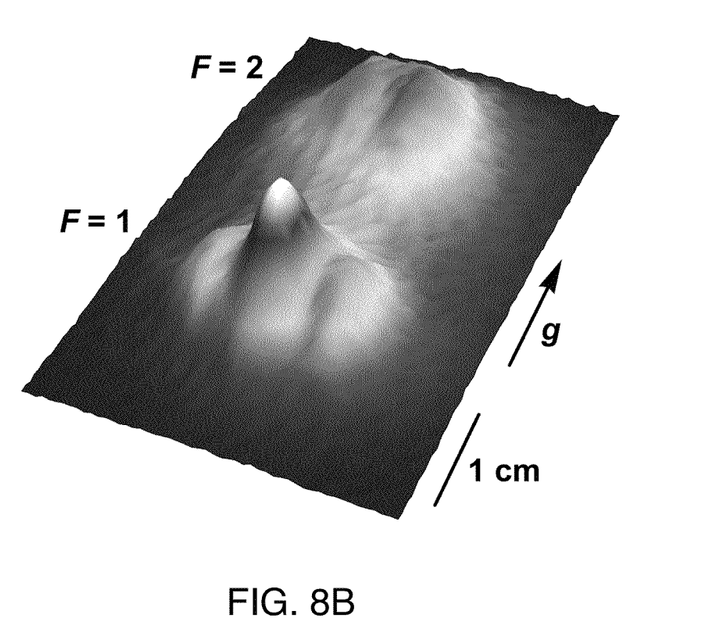

FIG. 8A is a schematic diagram of the experimental apparatus, showing beam-tilt phase shear readout. Atoms are cooled and launched upward into an interferometer region, not shown. Once they fall back to the bottom, the wavepackets are overlapped, yielding an interference pattern (gray fringes) imaged by two perpendicular cameras (CCD1,CCD2). An additional optical pulse separates the output ports (F=1 and F=2) by pushing the F=2 atoms downwards. All atom-optics pulses are performed by lasers incident from above and retroreflected off of a piezo-actuated mirror. Tilting this mirror by an angle $\delta\theta$ for the third atom-optics pulse yields a phase shear. FIG. 8B is a fluorescence image of the atomic density distribution taken with CCD2 after interference. Spatial fringes result from a third-pulse tilt $\delta\theta=60$ μrad about the x axis. The pushed F=2 atoms are heated, yielding reduced apparent contrast, and we ignore the F=2 port in subsequent analysis.

Here we use beam pointing to introduce shear in a way that is broadly applicable to existing light-pulse interferometer configurations. In particular, this method does not require Bose-Einstein condensed or ultra-cold atomic sources. Moreover, manipulating and measuring the spatial population modulation facilitates measurements of small phase gradients, as we demonstrate by implementing a precise atom interferometric gyrocompass. Finally, we demonstrate arbitrary control over the phase shear axis by combining laser beam pointing and atom-optics pulse timing asymmetry.

The apparatus and methods are similar to those of section B above. Using evaporative cooling followed by a magnetic lens, we obtain a cloud of $4 \times 10^{6}$ $^{87}$Rb atoms with a radius of 200 μm and a temperature of 50 nK. At this low density atomic collisions are negligible. These atoms are prepared in the magnetically insensitive $|F=2, m_F=0\rangle$ state and launched vertically into an 8.7 m vacuum tube with a chirped optical lattice. They fall back to the bottom after 2.6 s, and we use a vertical fluorescence beam to image them onto two perpendicular CCD cameras (FIG. 8A).

While the atoms are in free-fall in a magnetically shielded region, we perform light-pulse atom interferometry with a $\pi/2$-$\pi$-$\pi/2$ acceleration-sensitive configuration with a duration of $2T=2.3$ s. The atom-optics pulses are applied along the vertical axis using two-photon Raman transitions between the $|F=2, m_F=0\rangle$ and $|F=1, m_F=0\rangle$ hyperfine ground states (the lasers are detuned 1.0 GHz blue of the $|F=2\rangle \rightarrow |F'=3\rangle$ transition of the $D_2$ line). The atom-optics light is delivered from above and retroreflected off of an in-vacuum piezo-actuated tip-tilt mirror.

The effective wavevector $k_{eff}$ of the Raman transitions is determined by the pointing direction of the retroreflection mirror, which is set for each atom-optics pulse with 1 nrad precision. The mirror has three independent piezo actuators in a tripod configuration that allow arbitrary 2-axis tip-tilt control. We compensate for phase shifts arising from Earth's rotation by applying appropriate tilts for each of the three pulses, but additional mirror tilts can be used to induce shear for PSR.

To generate a controlled phase shear, we tilt the piezo-actuated mirror for the final $\pi/2$ pulse by an angle $\delta\theta$ with respect to the initial two pulses (in addition to the tilts needed for rotation compensation). In the semi-classical limit, the phase shift for a three-pulse interferometer is $\Delta\Phi = k_1 \cdot x_1 - 2k_2 \cdot x_2 + k_3 \cdot x_3$, where $k_i \equiv k_{eff,i}$ is the effective propagation vector at the time of the ith pulse and $x_i$ is the classical position of the atom. For example, tilting $k_3$ by an additional angle $\delta\theta$ about the x axis yields a phase $\Phi_H = k_{eff} \delta\theta y_3$ across the cloud, where $y_3$ is the horizontal position at the third pulse (FIG. 8A). This shear is independent of the details of the previous atom-laser interactions and of the implementation of the atomic source (in particular, its spatial extent, temperature, and quantum degeneracy).

FIG. 8B shows an image of the interferometer output with horizontal phase shear. An optical "pushing" pulse, 5 μs long and resonant with the $|F=2\rangle \rightarrow |F'3\rangle$ transition, spatially separates the interferometer output ports. We spatially separate the output ports because the imaging procedure is not state selective. Complementary fringes appear across each port, corresponding to the spatial variation of the atomic transition probability. For linear shears, we can write the phase as $\phi(r)=k\cdot r+\phi_0$, where $\phi_0$ is the overall interferometer phase and $\kappa$ is the wavevector of the spatially varying component. This implies a spatial modulation of the atomic distribution given by $$P(r) = \frac{1}{2} + \frac{C}{2}\sin(k\cdot r + \phi_0),$$

where C is the contrast.

Since the retroreflection mirror can be tilted about an arbitrary horizontal axis, beam-tilt PSR can yield fringe patterns with $\hat{\kappa}$ anywhere in the xy plane, orthogonal to the laser beam axis (see FIG. 8A). For instance, it is possible to choose a tilt axis parallel to the line-of-sight of either CCD. We then see a spatial fringe pattern with one camera, but no contrast with the other. Hereafter, we tilt about the x axis, yielding fringes on CCD2.

Figure 9A:
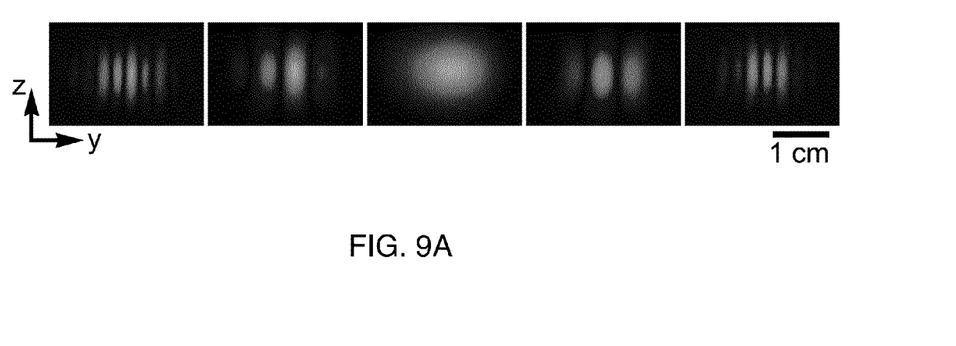
FIGS. 9A-B show horizontal PSR fringes obtained by providing a beam tilt between optical pulses of an atom interferometry sequence.
Figure 9B:
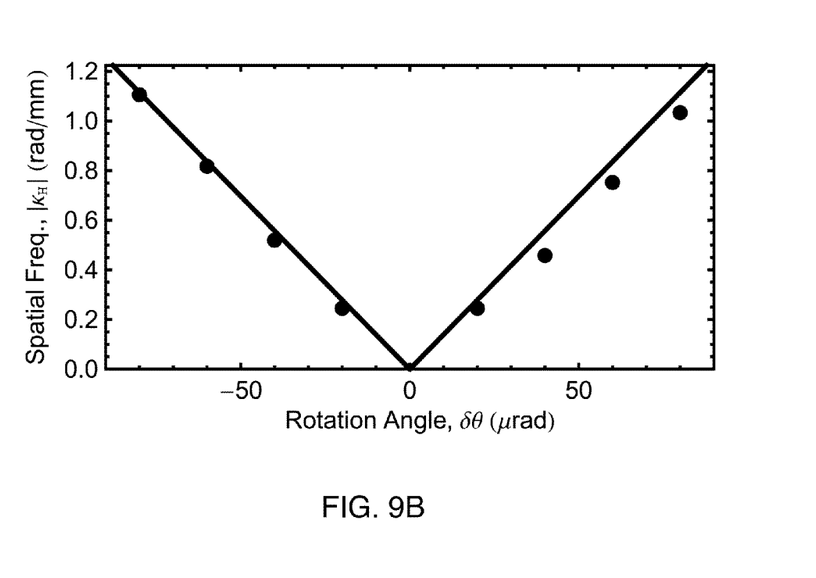

FIG. 9A show horizontal fringes resulting from beam-tilt PSR in a 2T=2.3 s interferometer. The spatial fringes are observed on CCD2 with third-pulse tilt angles $\delta\theta=-80, -40, 0, +40, +80$ µrad (left to right). Each image is the second-highest variance principal component arising from a set of 20 fluorescence images. FIG. 9B shows measured fringe spatial frequency $|\kappa_H|$, resulting from images filtered using principal component analysis. We bin the images vertically and fit a Gaussian modulated by the interference term P(r). The curve is a prediction with no free parameters that includes a reduction in the measured wavelength from heating during imaging. We determine this correction factor with an independent measurement of the fringe spatial frequency versus imaging time. For horizontal fringes, the observed spatial frequency decreases by 5% for 5 ms imaging.

The spatial frequency $\kappa$ of beam-tilt PSR fringes is set by the tilt angle $\delta\theta$. FIG. 9B shows the expected linear dependence. By appropriate choice of $\delta\theta$, the fringe period can be tuned to an arbitrary value (in practice, high spatial frequencies are limited by the depth of focus of the imaging system). Because we detect the atoms at a final drift time $t_d=2.7$ s that is later than the third pulse time $t_3=2.5$ s (both measured from the time of trap release), we must correct for the continued motion of the atoms. In the limit where the initial size of the atomic source is much less than the final spatial extent of the cloud (i.e., the point source limit of section B), the position at $t_d$ of an atom with velocity $v_y$ is $y \approx v_y t_d \approx y_3 t_d/t_3$. The detected horizontal fringe spatial frequency is then $\kappa_H \equiv \partial_y \Phi_H = k_{eff} \delta\theta t_3/t_d$. Note that the point source limit is relevant here only as an imaging artifact, resulting from $t_d > t_3$. It is not necessary for PSR.

Figure 10A:
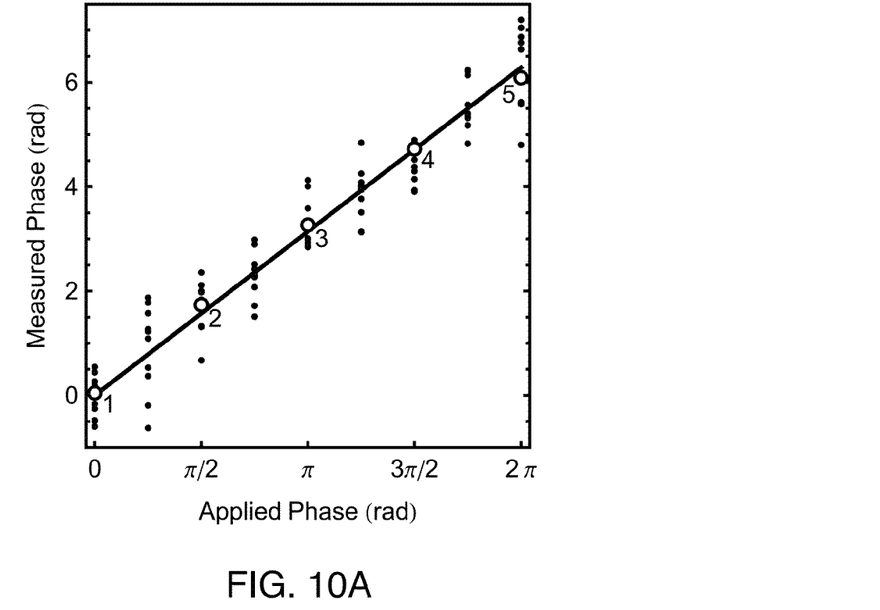
FIGS. 10A-B show exemplary single shot PSR data.

We demonstrate single-shot phase readout by implementing a short interferometer sequence (2T=50 ms) near the end of the 2.7 s drift time. In this case, the atom cloud has a large spatial extent for the entire pulse sequence. For each shot, we set the interferometer phase with an acousto-optic modulator and read it back using beam-tilt PSR with $\delta\theta=60$ µrad. FIG. 10A shows the expected correspondence between the applied and measured phases. The spread in the measured phase is due to technical noise associated with spurious vibrations of the Raman laser beam delivery optics. This spread exceeds $2\pi$ at longer interrogation times, but fringe fits still yield a precise phase for each shot.

Figure 10B:
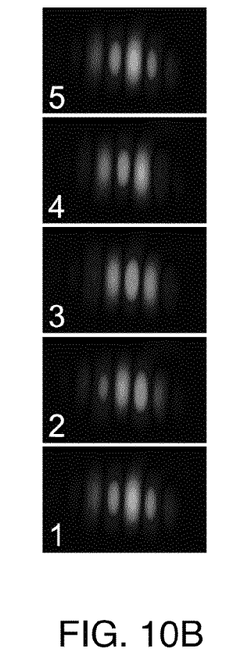

FIG. 10A shows single-shot phase readout with a 2T=50 ms interferometer. The measured phase is plotted versus the applied phase of the final atom-optics pulse for 96 shots. A line with unity slope is shown for reference. The measured phase is fit from images like those in FIG. 10B. FIG. 10B shows five sample interferometer shots (open circles in FIG. 10A), separated in measured phase by $\sim\pi/2$ rad. All images are filtered with principal component analysis.

To show how PSR can enable precision measurements, we implement an atom interferometric gyrocompass in a long interrogation time (2T=2.3 s) configuration. In this case, the Raman laser axis is rotated to compensate Earth's rotation, keeping this axis inertially fixed throughout the interrogation sequence. At the latitude of our lab in Stanford, Calif., this corresponds to an effective rotation rate of $\Omega_E=57.9$ µrad/s about an axis along the local true North vector, which is at an angle $\phi_E \approx 15°$ with respect to the negative x axis (coarsely determined cartographically). However, a small misalignment $\delta\phi_E \ll 1$ between the rotation axis of the retroreflection mirror and true North results in a residual rotation $\delta\Omega \approx \delta\phi_E \Omega_E(\hat{x}\sin\phi_E - \hat{y}\cos\phi_E)$ that leads to a Coriolis phase shift $\Phi_C=2k_{eff}(\delta\Omega \times v)T^2$ that varies across the cloud. As before, in the point source limit $v_y \approx y/t_d$, so the Coriolis phase gradient is $\kappa_{C,y} \equiv \partial_y\Phi_C = 2k_{eff}T^2\delta\phi_E\Omega_E \sin\phi_E/t_d$. To realize a gyrocompass, we vary the axis of applied rotation by scanning $\delta\phi_E$, and identify true North with the angle at which $\kappa_{C,y}=0$.

It can be challenging to measure small phase gradients with spatial frequencies $\kappa \ll 1/\sigma$, where $\sigma$ is the width of the atom ensemble. In this limit, less than one fringe extends across the cloud, so the fringe fitting method in FIG. 9B cannot be used. Instead, the gradient can be estimated by measuring phase differences across the ensemble (e.g., with ellipse fits as considered above), but this procedure can be sensitive to fluctuations in the atomic density distribution (width, position, and shape).

To circumvent these issues, we take advantage of PSR by applying an additional shear that augments the residual Coriolis shear $\Phi_C$. An additional tilt of $\delta\theta=\pm 60$ µrad about the x axis is added for the final interferometer pulse. This introduces a horizontal shear $\Phi_H$ with approximately 2.5 fringe periods across the cloud, enough to use fringe fitting to extract the spatial frequency. Subtracting off the known contribution of the additional tilt then yields a measurement of the small residual Coriolis shear. This technique of shifting a small phase gradient to a larger spatial frequency is analogous to a heterodyne measurement in the time domain. In both cases, the heterodyne process circumvents low frequency noise.

Depending on the sign of the tilt angle, the applied shear adds to or subtracts from $\Phi_C$. The combined phase gradient is then $\kappa_\pm = k_{eff}|\delta\theta|t_3/t_d \pm K_{C,y}$. By alternating the sign of the additional 60 µrad tilt and subtracting the results, we realize a differential measurement whereby systematic uncertainty in the applied shear is mitigated: $\Delta\kappa \equiv \kappa_+ - \kappa_- = 2\kappa_{C,y}$, independent of $|\delta\theta|$.

Figure 11:
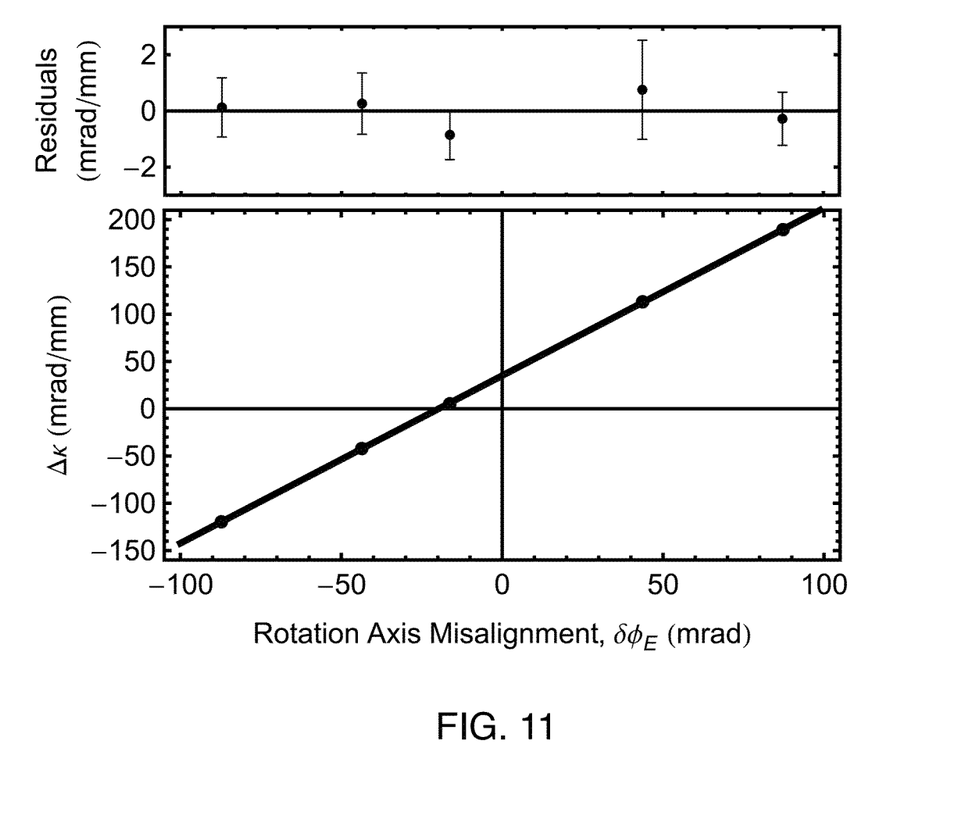
FIG. 11 shows operation of the setup of FIGS. 8A-B as a gyroscope.

FIG. 11 shows the expected linear scaling of the differential spatial frequency $\Delta\kappa$ as a function of the applied rotation angle $\delta\phi_E$. Each $\Delta\kappa$ point is the combination of 40 trials, 20 each at two applied tilt values ($\delta\theta=\pm 60$ µrad). A linear fit to the data yields a horizontal intercept that indicates the direction of true North with a precision of 10 mdeg. An apparatus optimized for gyrocompass performance could achieve similar or better precision in a more compact form factor. Also, this method does not require a vibrationally stable environment since the measurement uses the fringe period, not the overall phase.

Figure 12A:
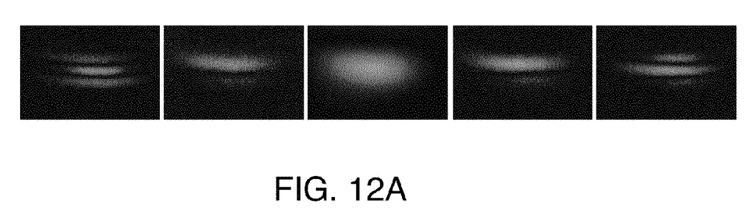
FIGS. 12A and 12C show vertical PSR fringes obtained by providing a timing asymmetry between optical pulses of an atom interferometry sequence.

Finally, we show how combining beam tilts and interferometer timing asymmetries provides arbitrary control over the spatial wavevector $\kappa$ of the applied phase shear. While a beam tilt applies a shear transverse to the interferometer beam axis, timing asymmetry yields a shear parallel to the beam axis ($\kappa \| \kappa_{eff}$) in the point source limit. To create an asymmetric interferometer, we offset the central π pulse by δT/2 such that the time between the first and second pulses (T+δT/2) is different from the time between the second and third pulses (T−δT/2). The resulting phase shift, $\Phi_V = k_{eff} v_z \delta T$, depends on the atoms' Doppler shift along the direction of $k_{eff}$. The phase shear at detection is then $\kappa_V = \partial_z \Phi_V = k_{eff} \delta T / t_d$. FIG. 12A shows the resulting vertical fringes, which are orthogonal to those from beam tilts (FIG. 9A) and are simultaneously visible on both CCD cameras. The fitted fringe frequency shown in FIG. 12C exhibits the expected linear dependence on δT, deviating at low spatial frequency due to the difficulty of fitting a fringe with $\kappa \sim 1/\sigma$.

Figure 12B:
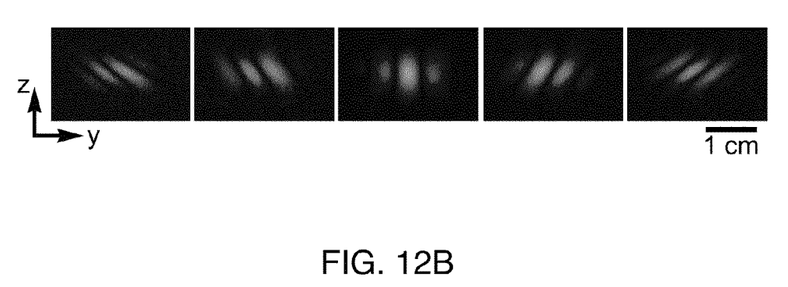
FIGS. 12B and 12D show PSR fringes at various angles obtained by providing both a beam tilt and a timing asymmetry between optical pulses of an atom interferometry sequence.
Figure 12C:
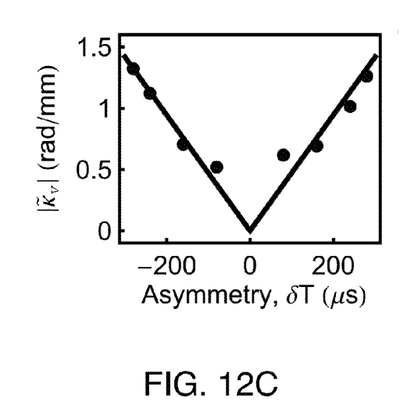
Figure 12D:
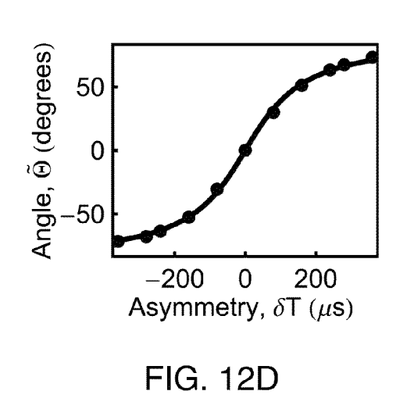

FIGS. 12A-D show arbitrary control of spatial fringe direction. FIG. 12A shows second-highest variance principal components from sets of 20 trials with timing asymmetry δT=−240, −160, 0, +160, +240 μs (left to right). FIG. 12B shows comparable images for trials with both a beam tilt δθ=40 μrad and δT=−160, −80, 0, +80, +160 μs (left to right). FIG. 12C show measured fringe spatial frequency extracted from fits to principal component filtered images with vertical fringes. FIG. 12D shows measured fringe angle extracted from fits to images with tilted fringes. For both FIGS. 12C and 12D, the curves are predictions with no free parameters.

For vertical fringes, the imaging pulse reduces the detected spatial frequency by stretching the cloud vertically. We independently characterize this stretch by measuring the fringe period as a function of imaging duration τ and extrapolating to τ=0. The results indicate a fractional stretch rate of α=0.12 ms$^{-1}$. The modified prediction for the spatial frequency is $\tilde{\kappa}V = \kappa_V/(1+\alpha\tau)$. With the τ=2 ms imaging time used, this agrees well with the measurements of FIG. 12C with no free parameters.

By combining beam tilt shear $\kappa_H$ with timing asymmetry shear $\kappa_V$, we can create spatial fringes at arbitrary angles.

The composite shear is at angle $\Theta = \arctan(\kappa_V/\kappa_H) = \arctan[\delta T/(\delta\theta t_3)]$. FIGS. 12B and 12D show fringe images and extracted angles using a δθ=40 μrad beam tilt combined with a range of timing asymmetries. To find the angles, we apply Fourier and principal component filters and fit with a two-dimensional Gaussian envelope modulated by an interference term P(r). We again correct for stretching during detection, which affects the measured angles. The modified prediction, $\tilde{\Theta} = \text{arc cot}[(1+\alpha\tau)\cot\Theta]$, shows good agreement with the measured angles of FIG. 12D with no free parameters.

We have demonstrated a precision gyrocompass with PSR, but arbitrary control of the shear angle facilitates measurements of phase shifts and gradients from any origin. For example, a vertical gravity gradient $T_{zz}$ induces a phase shear $k_{eff} T_{zz} v_z T^3$. This translates the measured angles of FIG. 12D such that $\Theta = \arctan[(\delta T - T_{zz} T^3)/(\delta\theta t_3)]$. For our parameters, this yields an effective asymmetry of 2 ns/E. PSR also enables measurements of nonlinear phase variations, including optical wavefront aberrations. For precision measurements dependent on absolute phase (gravimetry, atomic recoil measurements, etc.), PSR can suppress systematic error by making phase measurements independent of drifts in the contrast envelope. Finally, we expect PSR to be enabling for future inertial sensors operating on dynamic platforms, where single shot estimation of phase and contrast is vital.

The invention claimed is:

1. An atom interferometer comprising:
    an atom source;
    an interferometer region where atoms from the atom source are configured to propagate such that the atoms have interfering quantum amplitudes having a relative phase;
    at least one imaging detector, wherein a probability of detection of the atoms at the at least one imaging detector depends on the relative phase, and wherein the at least one imaging detector is configured to provide a spatially resolved image of the relative phase;
    wherein the interferometer is configured to provide a predetermined baseline fringe pattern at the at least one imaging detector, and wherein an output signal from the interferometer is obtained by analysis of a measured interference fringe pattern compared to the baseline fringe pattern.

2. The atom interferometer of claim 1, wherein the baseline fringe pattern is provided by configuring the atom source such that an atom ensemble expands from an initial ensemble size to a substantially larger final ensemble size at detection.

3. The atom interferometer of claim 2, wherein a ratio of the initial ensemble size to the final ensemble size is less than about 0.1.

4. The atom interferometer of claim 1, wherein the baseline fringe pattern is provided by an applied input shear of the relative phase in the atom interferometer.

5. The atom interferometer of claim 4, wherein the input shear is provided by application of a beam tilt between optical pulses in an atom interferometry excitation sequence.

6. The atom interferometer of claim 4, wherein the input shear is provided by application of a timing asymmetry between optical pulses in an atom interferometry excitation sequence.

7. The atom interferometer of claim 4, wherein the input shear is provided by application of both a beam tilt and a timing asymmetry between optical pulses in an atom interferometry excitation sequence.

8. The atom interferometer of claim 1, wherein the baseline fringe pattern is provided by
    1) configuring the atom source such that an atom ensemble expands from an initial ensemble size to a substantially larger final ensemble size at detection and by
    2) an applied input shear of the relative phase in the atom interferometer.

9. The atom interferometer of claim 1, wherein the atom interferometer is configured for single shot operation.

10. The atom interferometer of claim 1, wherein the atom interferometer is configured for an application selected from the group consisting of: inertial force sensors, gyroscopes, attitude sensors, inertial navigation sensors and systems, gravity sensors, gravity gradient sensors, and optical wave front metrology sensors and systems.

11. The atom interferometer of claim 1, wherein the atom interferometer has an interferometer axis along which optical pulses for atom interferometry propagate.

12. The atom interferometer of claim 11, wherein two of the imaging detectors are disposed having lines of sight that are perpendicular to each other and are also perpendicular to the interferometer axis.

13. The atom interferometer of claim 11, wherein at least one of the imaging detectors has a line of sight parallel to the interferometer axis.

14. The atom interferometer of claim 11, wherein at least one of the imaging detectors has a line of sight that intersects the interferometer axis at an angle other than 0 degrees or 90 degrees.

15. The atom interferometer of claim 1, wherein each imaging detector defines a corresponding interferometer port.

16. The atom interferometer of claim 1, wherein one of the imaging detectors defines one or more interferometer ports.

* * * * *